June 6, 1950     F. M. DE LAVAL     2,510,561
AIRPLANE CONTROL SURFACE
Filed July 22, 1944     4 Sheets-Sheet 1
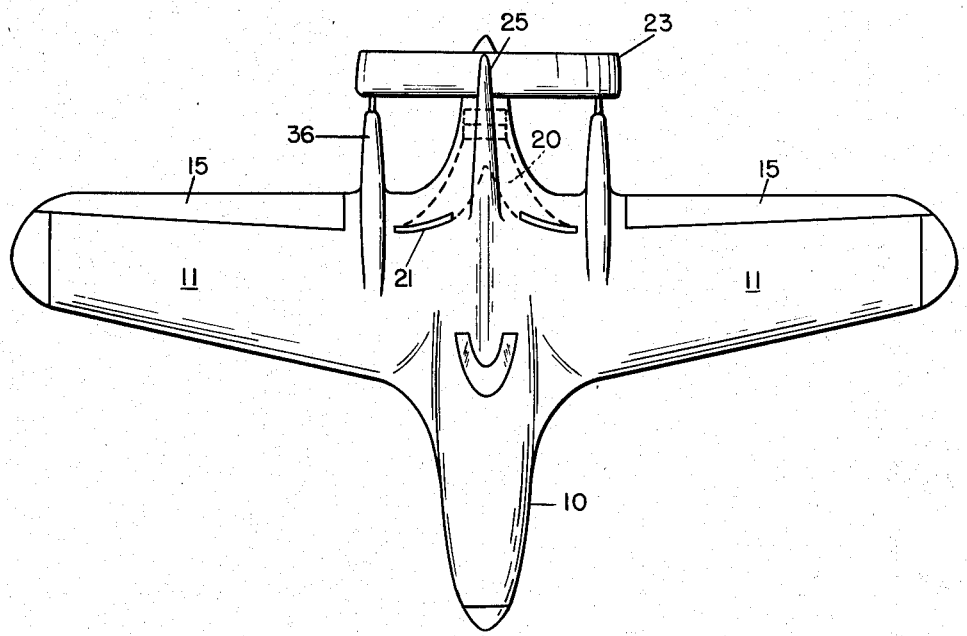
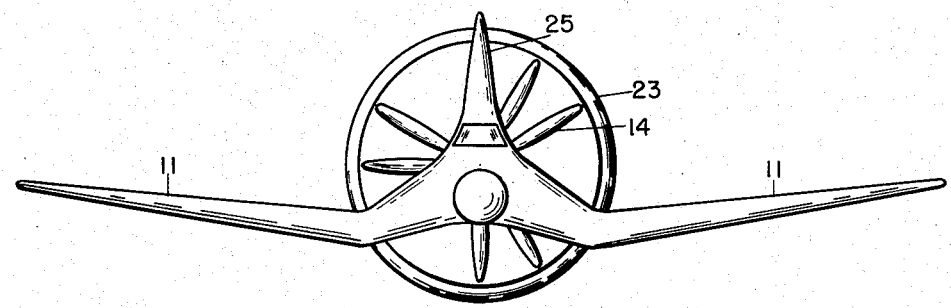
INVENTOR.
FULVIO M. DE LAVAL
BY
George C. Sullivan
AGENT

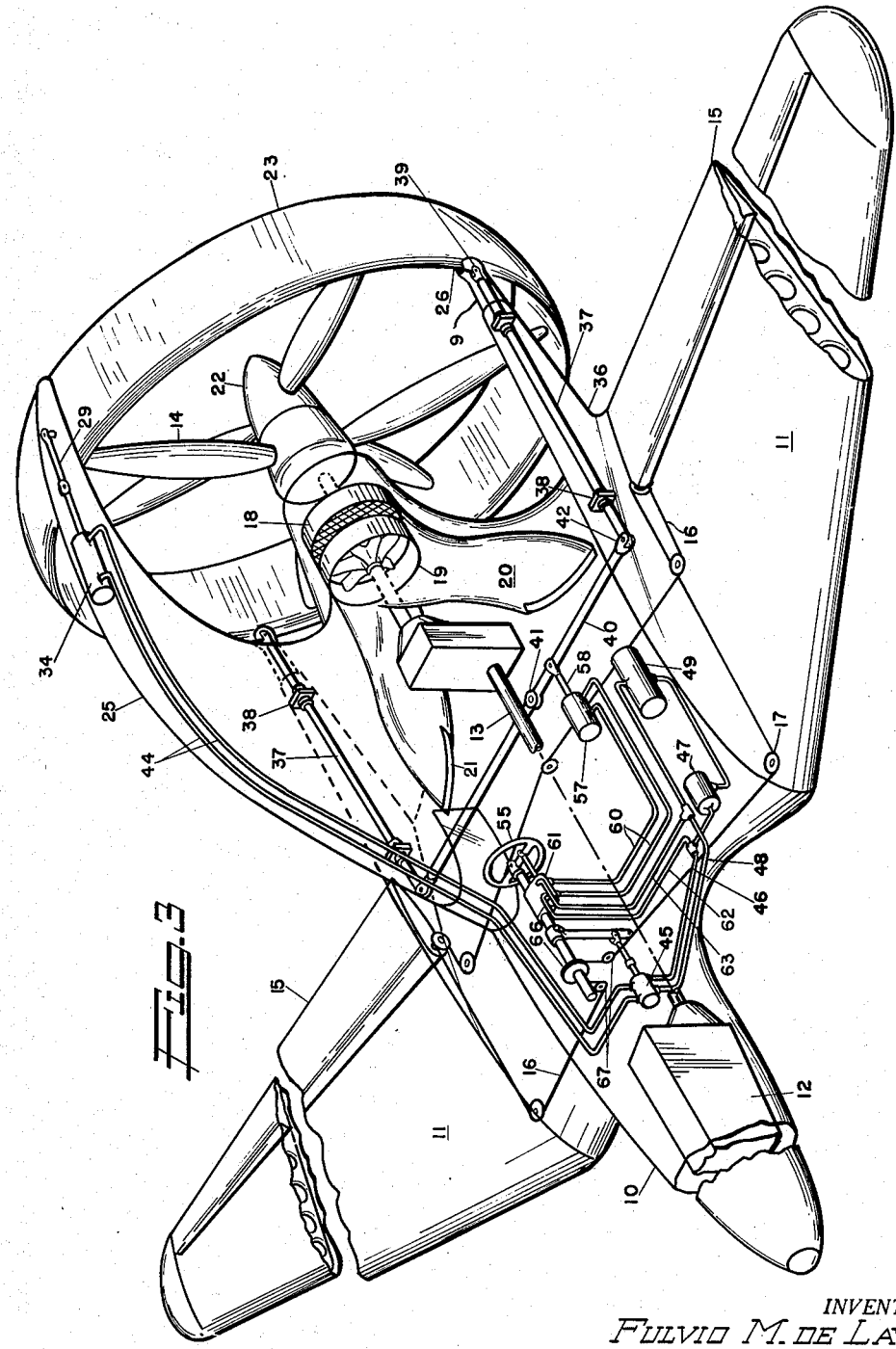

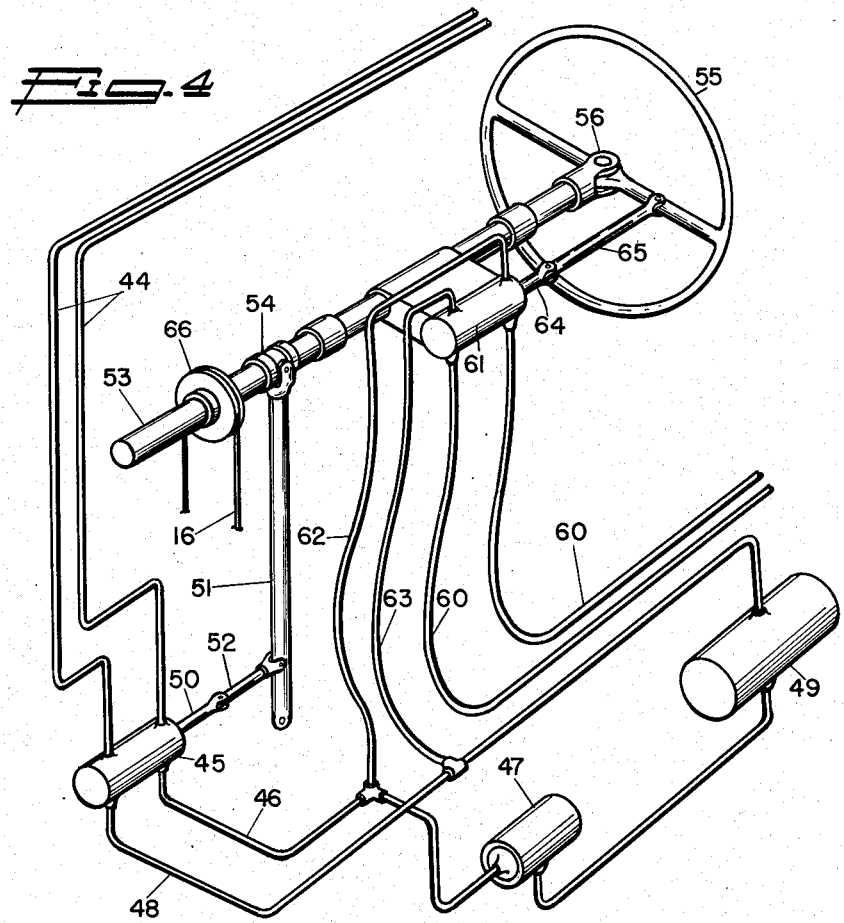
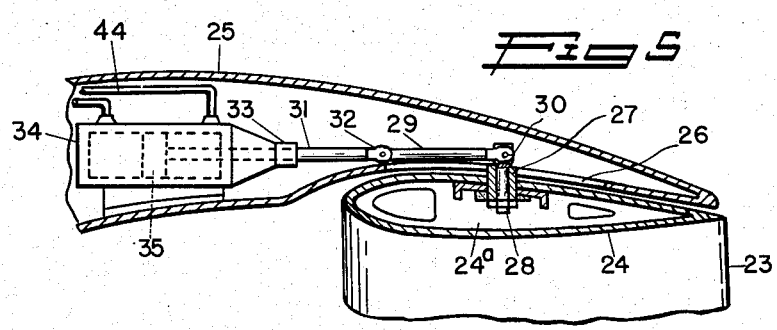

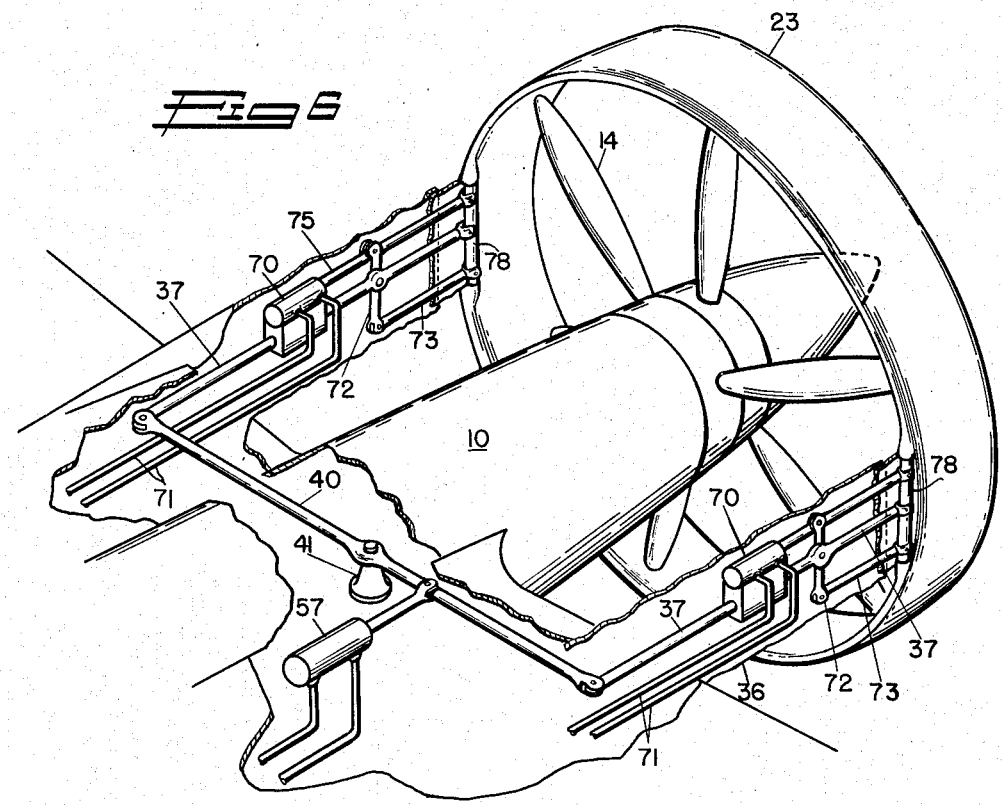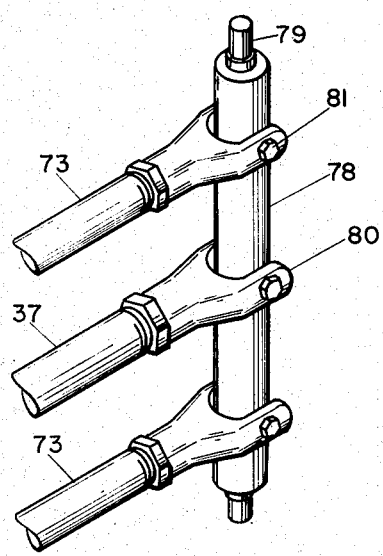

Patented June 6, 1950

2,510,561

UNITED STATES PATENT OFFICE 2,510,561

AIRPLANE CONTROL SURFACE

Fulvio M. de Laval, Los Angeles, Calif., assignor to Lockheed Aircraft Corporation, Burbank, Calif.

Application July 22, 1944, Serial No. 546,131

5 Claims. (Cl. 244—87)

This invention relates to aircraft and it is a general object of the invention to provide an efficient, practical and dependable airplane of unique design and operation. Although the principles of the invention are not restricted to any given class of aircraft I will herein refer to heavier-than-air craft it being understood that the invention is capable of embodiment in air-borne vehicles of various classes.

Another object of the invention is to provide an airplane characterized by a single tail surface element which serves as both the longitudinal and directional stabilizing and control surface means. In the airplane of this invention a single tail element replaces the vertical fin, horizontal stabilizer, rudders and elevators of the conventional empennage or tail assembly, thus greatly simplifying the design and fabrication.

Another object of the invention is to provide an aircraft of the character referred to in which the single tail element is differentially controllable to obtain directional control and pitch or elevational control. This provides for material simplification and consolidation of the essential controls with an accompanying reduction in weight and the cost of manufacture and maintenance.

Another object of the invention is to provide an airplane characterized by an especially advantageous relationship between the propellers or other propulsive means, and the single empennage or tail element mentioned above. The tail element may be in the form of a continuous ring or annular unit arranged in surrounding relation to the propellers. This removes the tail surfaces from the slip stream of the propeller eliminating the early formation of a shock wave on the tail surfaces, and eliminating buffeting of the tail surfaces due to "nibbling" and like phenomena. In conventional airplane design the tail surfaces are often in the slip stream of the propellers and are therefore subject to the accompanying shock wave effect, buffeting, etc. This is completely avoided in the airplane of the present invention. Furthermore, the surrounding relationship of the tail ring to the propellers, or other propulsive means, materially increases the propulsive efficiency thus adding to the speed and range of the airplane.

Another object of the invention is to provide an airplane of the character referred to in which the tail unit has a high slope of balancing moment curve allowing for a substantial reduction in the overall length of the airplane. This feature of the invention further reduces the cost of construction and maintenance and is of particular importance in the case of aircraft intended for transport and use on water borne craft such as aircraft carriers, where it is desirable to keep the length of the airplane to a minimum.

A further object of the invention is to provide an airplane of the character mentioned in which the tail surfaces are symmetrically disposed about or concentric with the longitudinal axis of the craft.

A still further object of the invention is to provide an airplane of the character above referred to embodying a simple practical and dependable control for the tail ring operable from a single station and if desired by manipulation of a single wheel, or the like, for changing the angular position of the tail ring for either directional control or elevational control of the airplane or both. The control of the invention is operable to tilt the tail ring about a transverse or generally horizontal axis to provide for elevational control of the craft, and is operable to yaw the tail ring to provide for steering control of the airplane. The two dimensions of control may be concurrently obtained by the differential control feature of the invention. Furthermore, the ailerons or other conventional control surface elements of the airplane may likewise be operated by the single control means of the invention.

Other objects and advantages of the invention will become apparent from the following detailed description of typical preferred embodiments wherein reference will be made to the accompanying drawings in which:

Figure 1 is a plan view of an airplane embodying the present invention;

Figure 2 is a front elevation of the airplane;

Figure 3 is an enlarged diagrammatic perspective outline view of the airplane illustrating the control system for the tail ring, and showing other internal parts of the airplane;

Figure 4 is an enlarged diagrammatic perspective view of a portion of the control system;

Figure 5 is an enlarged fragmentary vertical section of a portion of the tail ring and the mechanism for operating the same to obtain elevational control;

Figure 6 is a fragmentary diagrammatic perspective view of another embodiment of the invention illustrating the tail ring and the mechanisms for operating the same;

Figure 7 is an enlarged fragmentary perspective view of the connections between the tail ring and operating rods of the control system.

In the drawings the invention is illustrated embodied in a pusher-type monoplane having fuselage 10 and sustentation means in the form of wings 11. The power plant or engine 12 is shown arranged in the nose or forward portion of the fuselage 10 with a suitable drive 13 extending rearwardly therefrom to a pair of dual rotation propellers 14 located at the tail or aft end of the fuselage. The wings 11 are equipped with the usual ailerons 15 operated or controlled by cables 16 engaged over appropriately positioned guide pulleys 17. A suitable cooler 18 having a blower 19 operated by the drive 13 is provided in the rear portion of the fuselage 10 and is supplied with air by ducts 20 leading to boundary layer slots 21 in the upper surfaces of the wings 11 adjacent their points of juncture with the fuselage 10. The air leaving the cooler 18 discharges rearwardly around the spinners 22 of the propellers 14. In some instances it may be desired to reverse the relationship between the cooler 18 and blower 19 so that the air leaving the blower discharges from the boundary layer slots. It should be observed that the fuselage 10 may be quite short with the pusher propellers arranged but a short distance rearwardly of the wings 11. Further it should be noted that the conventional tail assembly or empennage is absent from the aft end of the fuselage.

The invention provides a novel and highly efficient tail member replacing the customary empennage assembly. In the embodiment of the invention illustrated this tail member 23 is in the form of a continuous ring that is substantially cylindrical in end elevation as viewed in Figure 2, it being understood that the configuration of the ring may be varied to suit it for embodiment in specific aircraft. The ring 23 may be of uniform configuration and proportions throughout its circumference and is preferably air foil shaped in longitudinal cross section as best shown in Figure 5 to reduce the drag to a minimum and to have desirable aero-dynamic characteristics. It is preferred to make the member 23 of symmetrical configuration with respect to the central axis passing through it from its nose to its trailing edge to have a symmetrical or balanced lifting or control effect when in various angular positions. The construction of the annular tail member 23 may be varied greatly. In the particular case illustrated, the ring 23 comprises a suitable skin 24 of aluminum or aluminum alloy sheet stock, or other suitable skin material, and an appropriate internal supporting structure 24ª.

The tail surface or tail ring 23 surrounds the propulsive means and is preferably concentric with the longitudinal axis of the airplane and the propulsion means. I have shown the tail member 23 surrounding the two propellers 14, with suitable clearance between the tips of the propellers and internal surface of the ring member. The length or axial dimension of the tail ring 23 is preferably such that the ring protrudes beyond both propellers in the fore and aft direction when the ring is in its neutral position. The tail surface or ring 23 encircling the propellers 14 substantially increases the efficiency of the latter in accordance with the well-known propeller-in-tube principle. It is preferred to give the tail ring 23 sufficient axial length to remain in surrounding relation to the two propellers when the ring is tilted and yawed to effect pitch and directional control of the airplane, so that the propulsive efficiency of the propellers remains substantially unchanged during such movement or control of the tail ring. It is to be understood that the proportions of the tail ring may be varied considerably to obtain the required stabilizing effects, to present adequate control surface area, and to bear the most efficient relation to the particular propellers or other propulsive means employed.

The tail surface element or ring 23 is supported for yawing movement, that is, angular movement or tilting about a generally vertical axis to provide for the directional control of the craft, and is also supported for tilting or angular movement about a transverse or generally horizontal axis to provide for elevational or pitch control of the airplane. In accordance with the broader aspects of the invention, the means for supporting the tail surface element or ring 23 may take various forms. The supporting means illustrated in the drawings are associated with or form elements of the control means for operating or moving the tail ring. In Figures 1, 2, and 3 of the drawings there is a fin-like supporting structure or fairing 25 extending rearwardly along the top of the fuselage 10 and projecting over the upper portion of the tail ring 23. This fairing may be constructed as a part of the airframe structure and serves to contain and support elements of the control system, which is turn assist in carrying the tail ring 23. Referring to Figure 5 it will be seen that the underside of the fairing 25 conforms to and is spaced from the upper side of the tail member or ring 23 and is provided with a longitudinally extending slot 26. A vertical bearing 27 is suitably secured to the tail ring 23 and rotatably receives a stud 28 which passes upwardly through the slot 26. A link or rod 29 within the fairing 25 is connected with the stud 28 by a pivotal connection 30 having a horizontal axis. The rod 29 extends forwardly and is connected with a piston rod 31 by a pivotal connection 32 having a generally horizontal pivotal axis. The piston rod 31 is supported and guided by one or more suitable bearings 33. The piston rod 31 enters a cylinder 34 mounted within the fairing 25 and is connected to a piston 35 operable in the cylinder. It will be seen that the tail surface or ring 23 is engaged or supported from its upper side for turning or angular movement about a generally vertical axis.

The means for supporting the tail surface or ring 23 further includes tubular arms or booms 36 projecting rearwardly from the wings 11 at opposite sides of the fuselage 10, see Figures 1 and 3. The booms 36 may be constructed as parts of the airframe and are suitably faired into the wings. An operating rod or control rod 37 extends rearwardly through each boom 36, being supported at longitudinal spaced points for axial translation by suitable bearings 38. The rods 37 extend from the rear ends of the booms 36 for connection with the tail ring 23. The rods 37 preferably occupy a horizontal plane spaced below the longitudinal axis of the fuselage 10 and tail ring 23. In the particular airplane illustrated, the wings 11 are drooped adjacent the fuselage 10 and the booms 36 extend rearwardly from the drooped wing portions to be in the horizontal plane just referred to. It is to be observed that the combination of the dorsal fairing 25 and the booms carried by the drooped wings 11 provide for symmetrical or equidistant support points for the stabilizer and control ring 23. The projecting rear ends of the rods 37 are connected with the forward edge portion of the tail ring 23 by pivotal connections 39 having substantially horizontal axes. The connections 39 preferably have a common horizontal axis spaced below the central longitudinal axis of the tail ring 23. It will be seen that upon operation of the piston 35 referred to above, the tail ring 23 is rotated or tilted about the common axis of the connections 39. This movement of the tail surface 23 results in a change in the elevational direction of flight as will be readily apparent from an inspection of Figures 1, 2 and 3. Tubular sheaths 9 on the tail ring telescope forwardly into the booms 36 to protect the rear parts of the rods 37.

The supporting and operating rods 37 connected with the opposite side portion of the ring 23 are interconnected for simultaneous movement in opposite directions. A lever 40 is pivotally supported between its ends within the fuselage 10 at a suitable mounting 41. The lever 40 is substantially horizontal and its opposite ends are connected with the forward ends of the rods 37 by pivotal connections 42. It will be seen that upon operation of the lever 40 the tail ring 23 is yawed or rotated about its vertical axis. This yawing of the ring 23 controls the direction of flight of the airplane as will be readily apparent to those skilled in the art.

In accordance with the broader aspects of the invention, the tail ring 23 may be operated or controlled by any selected or appropriate control mechanism. For example, it may be operated by mechanical means, electrical means or fluid pressure means or by a combination of such mechanisms. The invention provides a particularly advantageous hydraulic system for operating and controlling the tail ring 23 it being understood that this is only one selected form of operating mechanism. The control system illustrated includes the above referred to cylinder 34 and piston 35 and hydraulic lines 44 leading to the opposite ends of the cylinder 34. Upon supplying pressure to the forward end of the cylinder 34, the tail member 23 is tilted or rotated to direct the airplane upwardly, and upon supplying fluid pressure to the rear end of the cylinder 34 the tail member is rotated about the horizontal axis to direct the craft downwardly. The lines 44 of the cylinder 34 extend to a four-way valve 45 in the fuselage 10. Fluid is supplied under pressure to the valve 45 by a line 46 extending from a suitable hydraulic pump 47 and a fluid return line 48 extends from the four-way valve 45 to a reservoir 49. The four-way valve 45 is preferably of the load-feel type to give the control system a desirable sensitivity and flexibility. In the drawings the four-way valve 45 is shown in a schematic manner as such valves are well-known in the art.

The stem 50 of the four-way valve 45 is operatively connected with a pivoted lever 51 through the medium of a link 52. The upper end of the lever 51 is operatively associated with a control spindle or shaft member 53. The member 53 is supported in the fuselage or cabin for ready manual rotation and translation. The upper end of the valve lever 51 is connected with the member 53 by a collar and yoke connection 54, so that the lever is operated upon axial movement of the member 53 but is unaffected by rotation of the member. A pilot's wheel 55 or the equivalent is provided on the aft end of the member 53. It will be seen that pitch or elevational control of the airplane may be conveniently accomplished by simple fore and aft movement of the wheel 55. The wheel 55 is connected with the movable control member 53 by a yoke and pivot connection 56 to provide for directional control of the airplane as will be later described.

The control system further includes an actuating cylinder 57 for operating the lever 40 to obtain steering or directional control. The piston rod 58 of the cylinder and piston mechanism 57 is pivotly connected with the lever 40 at a point spaced from its fulcrum 41. Fluid pressure lines 60 extend from the opposite ends of the cylinder 57 to a four-way valve 61. The valve 61 which is illustrated in a diagrammatic fashion is preferably of the load-feel type. The four-way valve 61 is secured to the manually movable control member 53 to move therewith. A fluid pressure line 62 leads from the pump 47 or the pressure line 46 to deliver pressure to the valve 61, and a return conduit 63 extends from the valve to the return line 48. The operating stem 64 of the four-way valve 61 is operatively connected with a spoke of the wheel 55 by a suitable link 65. It will be seen that by merely tilting or rotating the wheel 55 about the pivotal axis of its mounting 56 the surface element or tail ring 23 may be yawed or rotated about a vertical axis in either direction to control the direction of flight. Further it is to be observed that full differential control of the tail surface ring 23 may be obtained by moving the wheel 55 in the longitudinal direction while at the same time rotating it about its pivotal axis 56. The arrangement is such that the instinctive or automatic operation of the wheel 55 by the pilot produces the proper or desired control of the airplane.

The controls for the ailerons 15 may be operated by the selfsame wheel 55 employed to operate the control means of the tail surface ring 23. The cable 16 of the aileron control system engages over a pulley 66 fixed to the member 53, and idler pulleys 67 direct the cable 16 so as to maintain it in active engagement with the pulley 66 at all times. Upon rotation of the member 53 by means of the wheel 55 the cable 16 is operated to control the ailerons 15.

It is believed that the action and features of the tail surface ring 23 and its control means will be readily apparent from the foregoing detailed description. The ring 23 may be proportioned to present sufficient surface to obtain dependable longitudinal and directional stabilization of the airplane, even where the fuselage 10 is of minimum length from the wings to its tail. The ring-like tail element 23 may have a full circumference of 360° to provide maximum stabilizing and control surfaces. Where the tail member 23 is in encircling relation to the propellers 14 it is out of the slip stream of the propellers and is therefore not subject to the undesirable aerodynamic conditions imposed on conventional tail surfaces which in most instances are in the slip stream. Furthermore, the surrounding relationship of the tail member 23 to the propellers 14 materially increases the efficiency of the latter. Thus from an aerodynamic standpoint the tail surface in ring-like or substantially annular form arranged in encircling relation to the propellers 14 has marked advantages over conventional aircraft tail assemblies. The tail element 23 is a simple, readily fabricated component easily incorporated in the airplane. Its incorporation in the airplane provides for a high slope of balancing moment curve to allow the use of a short tail or aft portion in the fuselage construction with a proportionate reduction in the overall length of the airplane. As above described, the yawing and tilting of the ring-like tail member 23 may be carried out separately or in consonance, by appropriate manipulation of the wheel 55 to obtain full control of the craft in both directions; that is, directionally and elevationally. The single tail element 23 thus serves both as an effective stabilizing means and control surface means.

Figures 6 and 7 illustrate an embodiment of the invention in which the annular tail surface element or ring 23 is supported and operatively engaged at its opposite sides only, the top support or control connection being eliminated. The tail member 23, the lever 40, the cylinder 57, the propellers 14, etc., may be the same as above described and corresponding reference numerals are applied to the corresponding parts in the several figures. In this form of the invention, the rods 37 extend rearwardly from the lever 40 and are connected with the forward edge portions of the ring 23. The rods 37 are connected with the ring or tail element 23 at substantially diametrically opposite points occurring in a generally horizontal plane, so that upon operation of the cylinder and piston mechanism 57 the ring is yawed or caused to rotate about a substantially vertical axis to obtain steering or directional control of the airplane. The cylinder and piston mechanism 57 for producing the directional control is governed by the four-way valve 61 as above described.

In the construction illustrated in Figure 6, the means for rotating or tilting the tail ring 23 about a horizontal axis to provide for control in the pitch of the airplane includes a cylinder and piston mechanism 70 rigidly mounted on each rod 37 to move therewith. Fluid pressure lines 71 corresponding to the above referred to lines 44 and controllable by the four-way valve 45 communicate with the opposite ends of the cylinder mechanisms 70. The portions of the lines 71 adjacent the mechanisms 70 are flexible so as to not interfere with free movement of the rods 37. A rocker lever 72 is fulcrumed between its ends on each rod 37. Links or operating rods 73 are pivotally connected with the opposite ends of the levers 72 and extend rearwardly therefrom. The extremities of the rods 73 are connected with the forward edge portions of the tail ring 23 at points spaced above and below the points of connection of the rods 37 with the tail ring. The piston rods 75 of the cylinder mechanisms 70 are operatively connected with the upper ends of the levers 72. The two cylinder mechanisms 70 are connected in the fluid pressure system to be simultaneously operated in corresponding directions. Thus upon operation of the four-way valve 45 in one direction, the piston rods 75 move rearwardly in consonance and upon operation of the four-way valve in the opposite direction the rods simultaneously move forward. Upon rearward movement of the piston rods 75, the tail ring 23 is rotated about a horizontal axis to direct the craft upwardly, and upon forward movement of the piston rods, the tail ring is rotated to direct the airplane downwardly. It is to be observed that the cylinder mechanisms 57 and 70 may be separately operated to obtain independent control of the pitch and direction, or may be operated simultaneously to obtain differential control.

Any selected means may be employed to operatively connect the rods 37 and 73 with the generally annular tail member 23. In the drawings sleeves 78 are rotatable on vertical shafts or trunnions 79 suitably fixed to the ring. The rods 37 and 73 project from the rear ends of the booms 36 for connection with the sleeves 78 which are in alignment with the booms. I have shown yokes or forks 80 on the rear ends of the rods 37 and 73 for straddling the sleeves with suitable pivot pins 81 engaged through openings in the yokes and sleeves. With this form of mounting the stabilizer ring 23 is carried for movement about vertical and horizontal axes.

As above described the tail surface element 23 may be incorporated in aircraft of various classes and designs and may be modified in configuration to adapt it for embodiment in the particular craft. Accordingly where the terms ring, ring-like, annular, etc., are applied to the element 23 such terms are to be given a broad interpretation and are to be construed as contemplating ovate forms and other configurations that are not truly circular.

Having described only typical forms of the invention we do not wish to be limited to the specific details herein set forth, but wish to reserve to ourselves any variations or modifications that may appear to those skilled in the art or fall within the scope of the following claims.

I claim:

1. In an airplane having a fuselage, the combination of propulsive propeller means at the aft end of the fuselage, a substantially annular stabilizer encircling the propeller means in sufficiently close relation thereto to increase the propulsive efficiency thereof and arranged in substantially concentric relation to the longitudinal axis of the airplane, a boom extending upwardly and rearwardly from the fuselage, means carried by the boom and engaged with the upper peripheral portion of the stabilizer to support the same for movement about a generally vertical axis, means engaged with the forward edge of the stabilizer at opposite sides of the longitudinal axis supporting the stabilizer for movement about a generally horizontal axis, means acting through the medium of the first named means for moving the stabilizer about said horizontal axis, and means acting through the medium of the second named means for moving the stabilizer about said vertical axis, said movements of the stabilizer serving to control the direction of flight.

2. In an airplane having a fuselage and wings, the combination of propulsive propeller means at the aft end of the fuselage, a substantially annular stabilizer encircling the propeller means in sufficiently close relation thereto to increase the propulsive efficiency thereof, booms extending rearwardly from the wings and fuselage, means on two of said booms directly engaging the stabilizer at opposite sides of its longitudinal axis for supporting the stabilizer for movement about a horizontal axis, means on another of said booms directly engaging the stabilizer to provide for movement about a vertical axis, and a control system operable to move the stabilizer about said axes so that the stabilizer controls the direction of flight.

3. In an airplane having a fuselage and wings, the combination of propulsive means at the aft end of the fuselage, a substantially annular stabilizer encircling the propulsive means in sufficiently close relation thereto to increase the propulsive efficiency thereof, booms extending rearwardly from the wings and fuselage, means on two of said booms directly engaging the stabilizer at opposite sides of its horizontal axis for supporting the stabilizer for movement about a generally horizontal axis, means on another of said booms directly engaging the stabilizer to provide for movement about a generally vertical axis, and control means for operating the stabilizer to govern the direction of flight comprising a fluid pressure actuated unit for moving the stabilizer about said horizontal axis, a fluid pressure actuated unit for moving the stabilizer about said vertical axis, a fluid pressure operating system for operating said units, and a control for said system including a manually operable member movable to effect operation of said units individually or simultaneously.

4. In an airplane, an airframe structure having a fuselage and wings extending from the fuselage, propulsive means at the aft extremity of the fuselage, an empennage ring surrounding the propulsive means, the ring presenting stabilizing surfaces, means for supporting the ring for angular movement about axes intersecting the central fore and aft axis of the airplane including a boom extending rearwardly from each wing, a fin rising from the fuselage and extending rearwardly toward the ring, means on the booms and fin directly connected to the ring and supporting said ring for said angular movement, and control means in the booms and fin for imparting said angular movement to the ring to control the direction of flight of the airplane.

5. In an airplane, an airframe structure having a fuselage and wings extending therefrom, propulsive means at the aft extremity of the fuselage, an empennage ring surrounding the propulsive means, the ring presenting controlling and stabilizing surfaces, means for supporting the ring for angular movement about generally vertical and horizontal axes including a boom extending rearwardly from each wing, a fairing rising from the fuselage and then extending rearwardly toward the ring, means on the booms and fairing directly connected to said ring and supporting the ring for said angular movement, and fluid pressure actuated means in the booms and fairing for imparting said angular movement to the ring to control the direction of flight of the aircraft.

FULVIO M. DE LAVAL.

REFERENCES CITED

The following references are of record in the file of this patent:

UNITED STATES PATENTS

| Number | Name | Date |
| --- | --- | --- |
| 123,629 | Hemje | Feb. 13, 1872 |
| 1,327,543 | Funk | Jan. 6, 1920 |
| 1,742,461 | Cuddy | Jan. 7, 1930 |
| 1,813,645 | Townend | July 7, 1931 |
| 1,824,882 | Fritz | Sept. 29, 1931 |
| 1,957,896 | Marguglio | May 8, 1934 |
| 2,128,060 | Spratt | Aug. 23, 1938 |
| 2,137,385 | Butler | Nov. 22, 1938 |
| 2,160,089 | Schairer | May 30, 1939 |

FOREIGN PATENTS

| Number | Country | Date |
| --- | --- | --- |
| 131,497 | Great Britain | Aug. 28, 1919 |